W. W. HOPKINS.
CALCULATING MACHINE.
APPLICATION FILED DEC. 15, 1910.

1,049,716.

Patented Jan. 7, 1913.
6 SHEETS—SHEET 5.

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,049,716.  Specification of Letters Patent.  Patented Jan. 7, 1913.

Application filed December 15, 1910. Serial No. 597,512.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Fig. 3 is an enlarged vertical sectional view through the upper rear portion of the calculating machine; Fig. 3ª is a detail end view of the carrying segments.

This invention relates to new and useful improvements in calculating machines of that type illustrated in Belgian patent to Hubert Hopkins, No. 202,081, dated August 21, 1907, and also in the application for United States Letters Patent serially numbered 310,729, filed April 9, 1906, by Hubert Hopkins.

The object of this present invention is to provide a calculating machine of the type described, with a plurality of totalizers which are normally out of operative relation to the actuating devices, preferably to one side of the actuating devices, means being provided whereby a selected group of totalizer wheels may be positioned in the proper horizontal plane to be subsequently or contemporaneously moved longitudinally into operative relation to the actuating devices.

In the patent and application before mentioned, there are disclosed three groups of totalizer wheels mounted on a shaft which moves longitudinally across the actuating devices whereby a selected group of totalizer wheels carried by said shaft may be brought under control of said actuating devices either successively or at the will of the operator. In my present invention the three groups of totalizer wheels are mounted substantially in vertical alinement on independent shafts and are moved vertically to bring a selected group of totalizer wheels into the proper horizontal position, after which or contemporaneously with such movement, the selected group of totalizer wheels is moved horizontally in a direction longitudinally its shaft and over the actuating devices.

While I have shown three groups of totalizer wheels, it is obvious that more groups could be mounted on the vertically movable frame, or, if desired, instead of mounting the groups of totalizer wheels in a segmental frame, a cylinder could be employed whose partial revolution would bring the groups of totalizer wheels under control of the laterally moving positioning devices.

Many of the features disclosed in this present application are claimed in the application for United States Letters Patent just mentioned, and therefore I do not claim the same here. There are shown in the accompanying drawings many features which will not be described in detail here because the same are fully described in said United States application and Belgian patent, to which latter patent reference is made for a more extended description of many of the parts of the machine of this application. While the present improvements are designed to be applied to the machine shown in said patent and said application, it will be understood that by obvious modifications and changes many of these improvements could be applied to other types of calculating machines than the one herein specifically referred to. Therefore I do not wish to be understood as limiting my invention to the type of machine herein shown, as several of the features herein disclosed are broadly new and the principles of operation and equivalents could be utilized to advantage in connection with other types of calculating machines.

Figure 1:
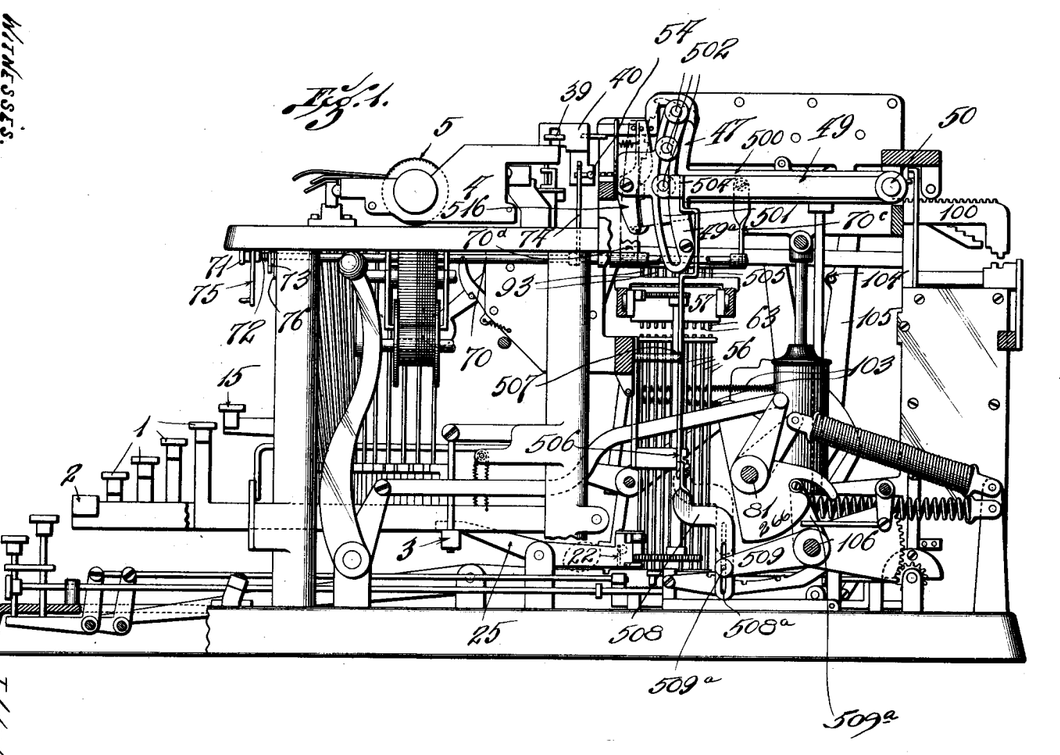
Figure 1 is a side elevational view of my improved machine.

*The typewriting mechanism.*—In the accompanying drawings, referring to Fig. 1, there is shown a typewriting mechanism of which 1 indicates the keys and key-bars. 2 is the spacing key of the typewriting mechanism, and 3 is a spacing bar controlling the escapement mechanism of the typewriter carriage. 4 is the frame of the typewriter carriage, in which is mounted a platen 5. Means are provided for manual rotation of this platen, as in line-spacing, and also mechanical rotation in line-spacing, where a record is being made by the printing devices of the adding mechanism of the machine. An escapement bar is provided whereby the carriage may move step-by-step laterally in letter or figure spacing, and tabulating keys 15 are provided whereby the carriage may be arrested at predetermined lateral positions for work of tabulation.

The typewriting mechanism of my present machine may, in addition to the essential features of such a mechanism, heretofore described, also be provided with such additional features as may be desired or useful.

I deem it unnecessary to give a more detailed description of the typewriting mechanism here, as a reference to the before-mentioned patent will give a full and clear explanation of the same.

Figure 2:
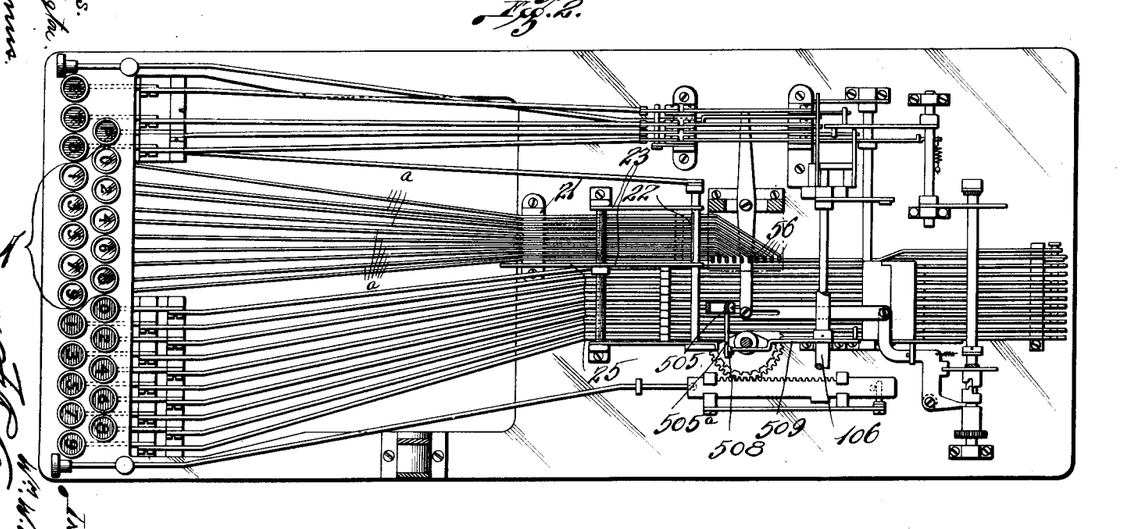
Fig. 2 is a horizontal sectional view taken just above the keyboard and with the typewriting mechanism removed.

*The adding mechanism.*—The keys in group A (see Fig. 2) which are identified with the adding mechanism, are connected to a series of bars *a* which are mounted upon a common pivot 21, said bars to the rear of said pivot having their ends deflected so as to lie in a straight line under a longitudinal row of independent vertically movable bars 56 which coöperate with the setting-up pins 63 of the carriage 57. The rear ends of these bars *a* extend under a plate 22 pivotally mounted in the free end of a yoke frame 23 which has a forward extension 25 arranged above the spacing bar 3 of the typewriter. In this manner the operation of any of the keys in group A will depress the bar 3 and actuate the escapement mechanism of the typewriter carriage, causing the carriage to move laterally step by step a number of spaces equal to the number of figures set up on the keys of group A. The operation of the carriage escapement from the keys in group A is particularly useful in lineal addition as it is only necessary to strike the space key once after the printing of each number.

Means are provided for locking the carriage against lateral movement in order that vertical columns of figures may be printed, but it is unnecessary to describe these means here in detail. Means are also provided for rotating the carriage in the operation of printing numbers one under the other in column formation, but it is unnecessary to describe such mechanism here as the same is fully set forth in the before-mentioned patent.

Figures 3, 3A:
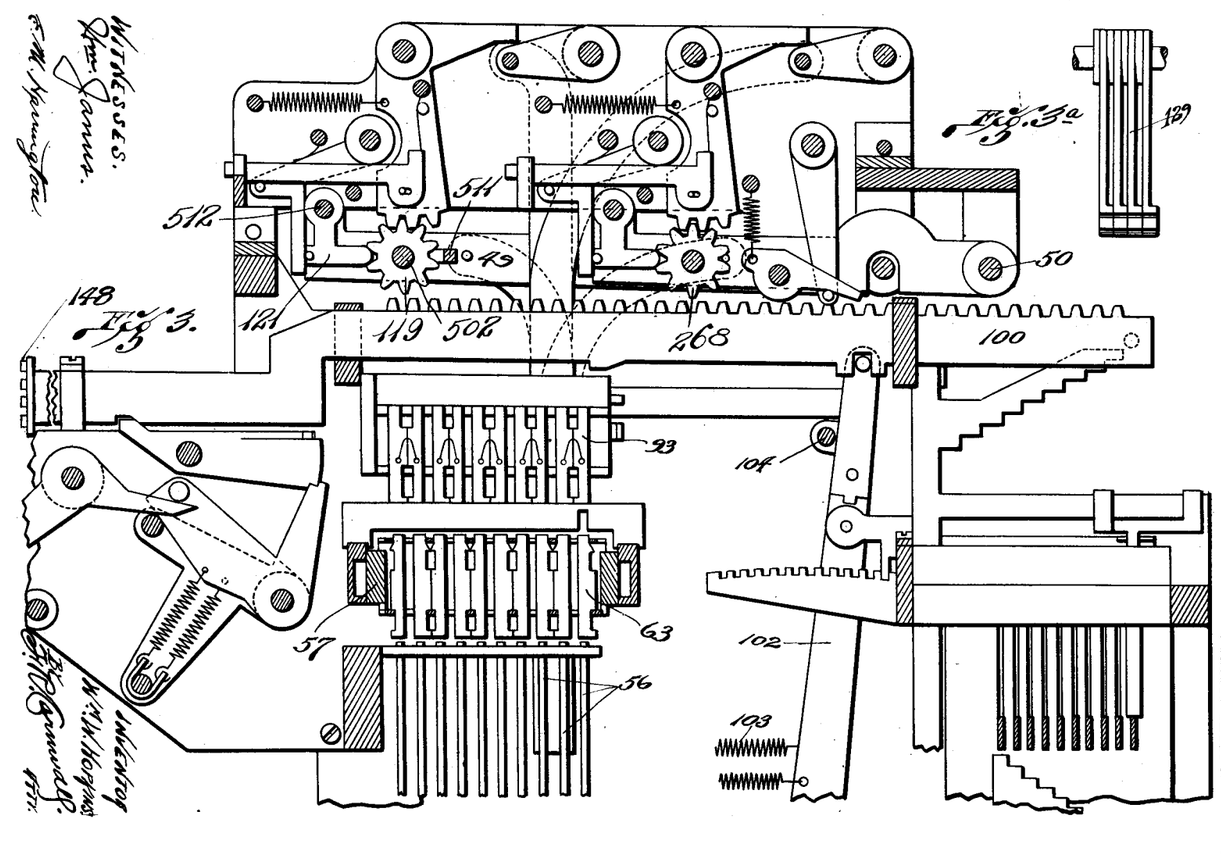
Figures 4, 5, 6, 7:
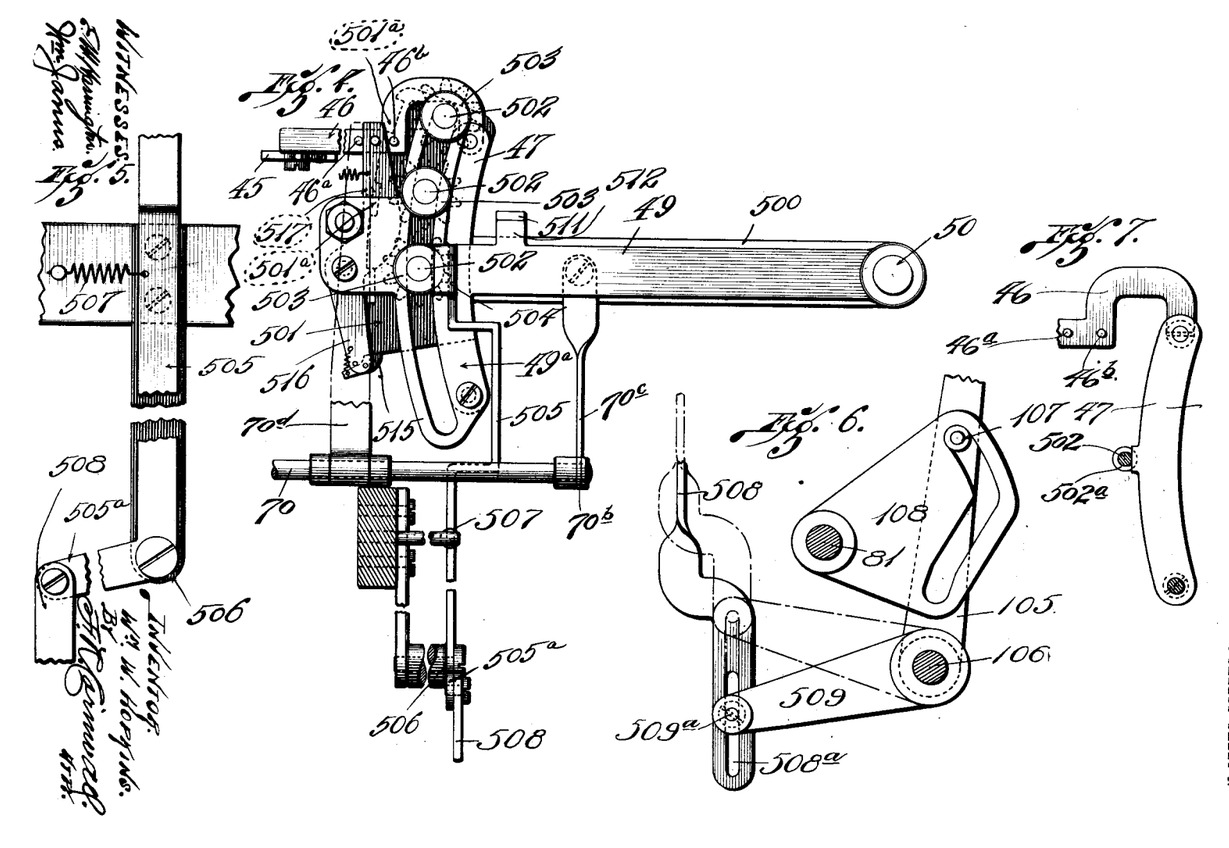
Fig. 4 is an enlarged detail side elevational view of the totalizer-carrying frames.
Fig. 5 is a fragmentary view of the means for positioning the totalizers laterally.
Fig. 6 is a fragmentary view of the lower portion of said means.
Fig. 7 is a fragmentary view of a portion of the escapement mechanism for the totalizer.
Figures 8, 9, 10:
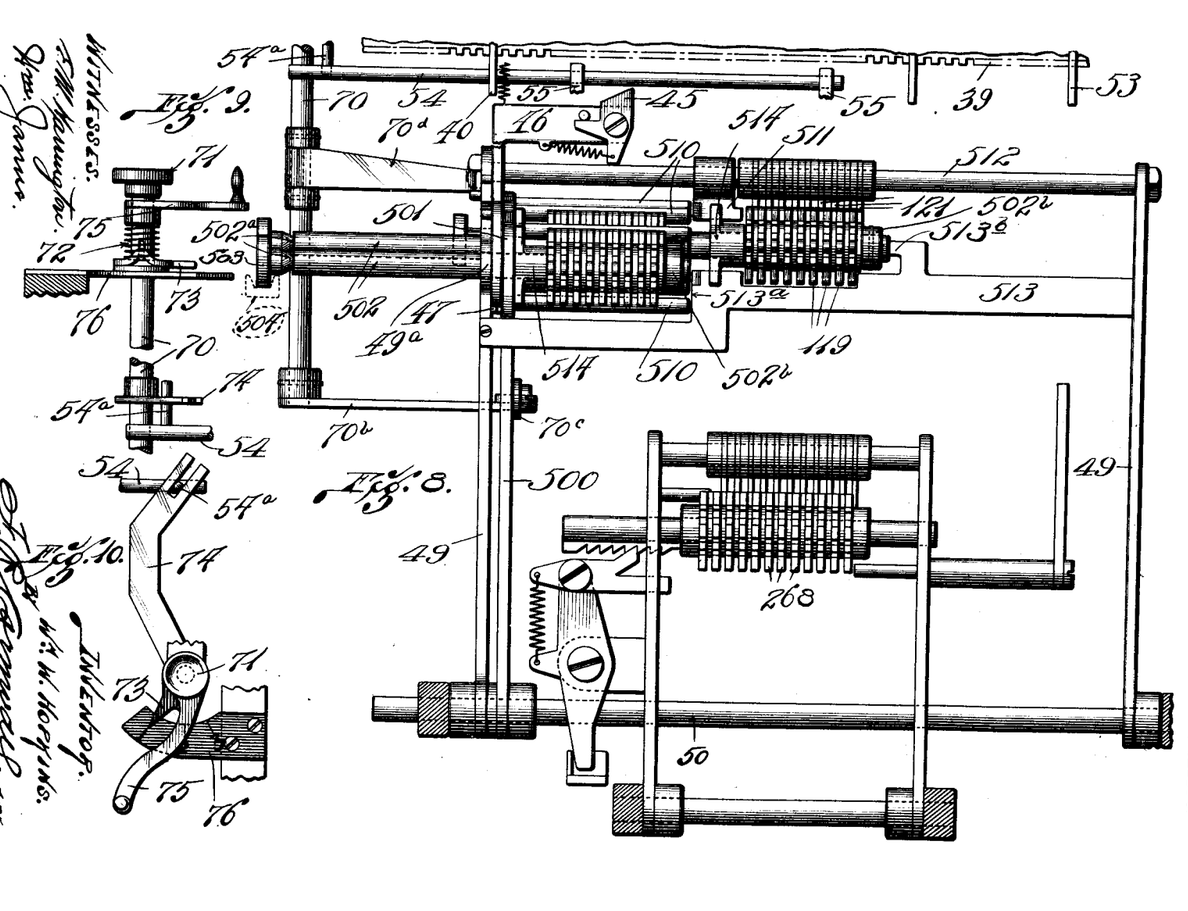
Fig. 8 is a top plan view showing the method of mounting the totalizers in their frames.
Fig. 9 is a top plan view of the manually operable means for positioning the totalizers.
Fig. 10 is a front elevational view of said means.
Figure 11:
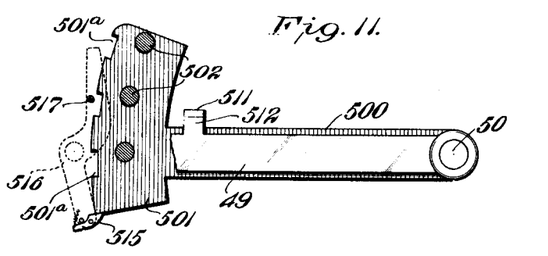
Figs. 11, 12 and 13 are diagrammatic views illustrating the manner of adjusting the vertical position of the totalizers.
Figure 12:
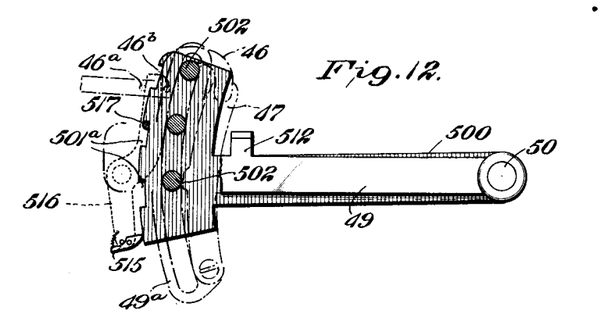
Figure 13:
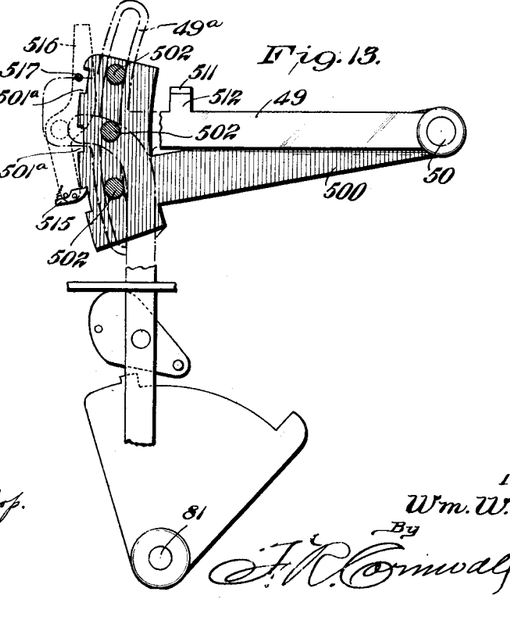

*Controlling the position of the forward totalizers from the typewriting carriage.*— Referring to Fig. 8, 39 indicates a bar which is carried by the typewriter carriage and whose rear end is provided with a series of notches in which may be adjustably mounted a series of blocks 40. There are preferably two of these adjustable blocks 40 which are designed to coöperate with a tappet 45 mounted on a sliding bar 46. This bar is connected at its rear end to an escapement lever 47, which escapement lever, when vibrated, permits the forward totalizer, which may be in position over the acuating devices, to move from left to right to one side of, and out of position with respect to, said actuating devices. The purpose of having two adjusting blocks 40 on the laterally movable paper carriage is to enable the operation of the tappet 45 twice as the carriage moves leftwardly. When the carriage is in its normal position at the left, the lowermost totalizer is in position to be moved horizontally over the actuating devices and will thus be capable to operation until such time as, in the leftward movement of the carriage the first block 40 coöperates with the tappet 46, which will disengage the lowermost totalizer, move the totalizers downwardly and place the second or middle totalizer in coöperative relation with the actuating devices. In order to disengage the middle totalizer and place the third or uppermost totalizer in coöperative relation with the actuating devices, the second block 40 is necessary. The two blocks are made adjustable so that the selection of a desired totalizer may be automatic in any predetermined leftward position of the paper carriage. 49 are two frame plates pivoted at their rear ends on a shaft 50 mounted in the frame of the machine. 500 is a frame pivotally mounted upon the shaft 50, preferably adjacent one of the frame plates 49. This frame carries a vertically disposed segmental plate 501 at its forward end in which are slidingly mounted shafts 502 of the several groups of totalizer wheels. These shafts also pass through a curved slot formed in a segmental extension 49$^a$ on the adjacent frame plate 49. Each shaft 502 is provided with a collar 503 at its outer end designed to be embraced, when the selected totalizer is in the horizontal plane to be moved laterally over the actuating devices, by a grooved block 504 on the upper end of a lever 505. This lever is pivoted to the frame of the machine at 506 and is connected to a spring 507 which tends to draw the upper end of said lever outwardly away from the actuating devices and move the set of totalizer wheels controlled thereby out of operative relation, and to one side of, said actuating devices. The lower end of lever 505 is provided with a bell crank extension 505ª to which is connected a link 508, preferably given a quarter turn, and in whose lower end is arranged a slot 508ª for coöperating with a pin 509ª on the end of an arm 509 mounted on the shaft 106. This shaft 106 has fixed to it the arms 105 which carry the reciprocating bar 104 for returning the arms 102 connected to the racks 100 by a slot-pin connection. One of the arms 105 which, with the bar 104, constitutes the reciprocating frame, is provided with a pin 107 fitting in the cam slot in cam 108 mounted on the shaft 81. The shaft 81 is rocked at each operation of the handle of the machine, and in its first movement the frame 105 is not actuated, but when the pin 107 rides in the fluctuation of the cam groove, the frame 105 is moved forward to permit the racks 100 to move forward, after which the lower concentric portion of the cam holds the frame 105 in its forward position. It is during the forward movement of the racks that the pin 509ª rides upwardly in the slot 508ª until it contacts with the upper end of the slot, when the lever 505 is rocked so as to move the totalizer engaged by the grooved block 504 thereof leftwardly over the actuating racks. This upward movement of the arm 509 is effected by means of a cam 266, see Fig. 1, which operates upon a roller upon the end of an arm 509ª fixed to arm 509. In the position of the parts shown in Fig. 4, which is the normal position of the parts, the lowermost group of totalizer wheels is connected to the grooved block 504, and, after an example has been set up on the key-board of the machine and the stops 93 positioned upon the initial movement of the handle, the racks 100, carrying type 148 at their outer ends, under the impelling action of springs 103, will be moved forwardly, when permitted to do so by the reciprocating bar 104, until arrested in their intended position. Of course the bar 104 will permit the racks 100 to move forwardly a distance of nine teeth if such is their intended movement, and it is during this movement of the racks that the lever 505 is rocked. The totalizer wheels, however, are so positioned that they do not interfere with the forward movement of the racks, said totalizer wheels being in a horizontal plane above the teeth of the racks so as to be meshed therewith. When a totalizer is moved over the racks, the escapement lever 47, heretofore referred to, will move forwardly and drop into a V-shaped groove 502ª in the outer end of the totalizer shaft (see Fig. 7) and hold said totalizer over the racks until the escapement block 40 on the paper carriage vibrates the lever 47 to release the shaft, whereupon the spring 507 will retract the group of totalizer wheels, moving said group laterally out of position with respect to the actuating racks. A segmental extension 501 on the forward end of frame 500, heretofore referred to, is provided with totalizer locking bars 510 which extend slightly beyond the totalizer wheel of highest order, as shown in Fig. 8. The forward bar of each set of totalizer wheels alines with a plate 511 arranged upon a stationary bar 512 which connects the forward ends of the frame plates 49, and upon which bar are also mounted the pendants 121 of the carrying mechanism. A plate 513 is provided with a shoulder 513ª which registers with the totalizer locking bar 510. Plate 513 is likewise secured to the side frames 49. In this manner, whenever any one of the totalizers is out of position with respect to the actuating devices, it is held against movement by the bars 510 arranged on each side thereof, and when said totalizers are brought into position the bars 510 register with the plates 511 and 513, so that, when the totalizers are moved over the actuating racks, they will ride upon said plates. These plates are preferably slightly beveled, so as to guide the teeth of the totalizer wheels thereon. Each totalizer shaft is provided with a winged hub 514, the wings of which ride upon the bars 510 in a manner similar to the totalizer wheels, and when the totalizer is moved over the racks this winged hub engages the plates 511 and 513 to support the totalizer shaft and provide a bearing therefor. The inner end of the totalizer shaft is provided with a centering recess into which fits a cone bearing 513ᵇ extending from the bar 513. The totalizer wheels are indicated at 119, they being confined between the hub 514 and a collar 502ᵇ on the inner end of the shaft 502. (See Fig. 8.) The manner of depressing the frame 49 to engage the totalizer wheels with the rack, is the same as set forth in the aforesaid application and patent, and need not be here described in detail. Normally, the parts are in the position shown in Figs. 8 and 11, wherein the lowermost group of totalizer wheels is in a position to be moved laterally over the actuating racks. A segmental plate which carries these groups of totalizer wheels is supported by a pawl 515 on the lower end of a lever 516, pivotally mounted upon one of the frame plates 49 so as to be movable therewith. The upper end of this lever passes between pins 46ª and 46ᵇ on the plate 46 which is connected to the escapement lever 47 (see Fig. 7) so that the lever 516 will be operated whenever the escapement lever is operated. A pin 517 is arranged on the lever 516 adjacent the forward edge of the segmental head 501 of the frame 500. The forward edge of this segmental head is provided with notches 501ª, as shown, and whenever the lever 516 is rocked, the pin 517 moves under the upper shoulder of a notch 501ª and the pawl 515 is withdrawn from the lower edge of the segmental plate (or from the upper shoulder of a notch, as the case may be), the parts being thus held (see Fig. 12) until the escapement lever is released, when the pin 517 will be withdrawn from its shoulder and the pawl 515 will be moved inwardly against the edge of the segmental plate in readiness to engage the next adjacent notch above it, when the totalizers descend. (See Fig. 13.) A spring may be provided to assist the downward movement of the totalizers, but ordinarily gravity will suffice. From the position of the parts shown in Figs. 8 and 11, the lowermost totalizer will be moved out of position and the next adjacent totalizer above it moved into position with its collar 503 embraced by the grooved block 504, whereby this totalizer is placed under control of the lever 505 and in position to be moved over the actuating devices. (See Fig. 13.) The next vibration of lever 516 will place the third or uppermost totalizer under control of the lever 505. When the escapement lever is operated, the totalizer in position over the actuating racks is in mesh with the carrying sectors 129, coincident with the release of the shaft 502 by the disengagement of the groove 502ª therein from the escapement lever 47, the segmental head being permitted to drop slightly so that the wheels 119 will be free from the carrying segments 129, but such downward movement is not sufficient to effect an engagement between the wheels 119 and the racks 100, hence the totalizer wheels have no dragging engagement across the teeth of either the carrying segments 129 or the racks 100. As stated before, the particular totalizer under control of the lever 505 will be moved into position over the racks when the handle is being pulled forward, and in this inward movement the frame 49 is in its uppermost position—that is the totalizer is not in mesh with the racks. To avoid interruption to this movement on the part of the segments 129, I prefer to widen the teeth of said segments 129 (as shown in Fig. 3ª), so as to avoid any spaces between them which might permit the totalizer wheels, which are now free, to rotate (they now being unrestrained by the bars 510, 511 and 513).

In the application and patent aforesaid, the teeth of the segments 129 are wider than the width of the segment plates. There is sufficient clearance between the widened teeth of the segments in the present construction and the totalizer wheels, to permit a free movement of the totalizer wheels into engagement with their respective carrying segments 129.

In addition to the selective control of the totalizers by the laterally moving paper carriage, I provide means for the manual selection and positioning of the totalizers, which means, as shown in Fig. 9, consists of a rod 70 mounted in the framing of the machine and carrying a head 71 and a crank arm 75 on its forward end, which head and rod are held forwardly by a spring 72. 73 is an indicator slidingly mounted on the rod 70 coöperating with a scale 76 mounted on the framing of the machine and marked with numerals 1, 2 and 3 indicating the first (lowermost), second (middle), or third (uppermost) totalizer under control of the lever 505 or in position over the actuating racks. This arm 70 coöperates with a bar 54 mounted in guiding projections 55 extending from the framing of the machine, with the end of which coöperates the restoring block 53 when the carriage is moved leftwardly. The bar 54 is provided with a pin or projection 54ª which fits in the slot of the rock arm 74. Thus, when the carriage is moved leftwardly, the arm 74 is rocked and with it the rod 70. A rod 70 is mounted in suitable bearings under the top plate of the typewriting machine and extends rearwardly and is provided with a rock arm 70ᵇ at its rear end which is connected by a link 70ᶜ to the frame 500; thus, by grasping the handle 75, the rod may be rotated so as to lift the frame 500 and the totalizers to their elevated position, the spring-pressed pawl 515 permitting this. If the uppermost totalizer is in position to be moved over the actuating racks, the frame 500 can be elevated to the second position or the first position, as desired. 70ᵈ indicates an arm extending from the rod 70 and engaging the plate 46, the purpose of this being to permit the manual operation of the escapement lever 47 by pushing the rod 70 inwardly to release a totalizer which may be over the actuating racks so as to permit its lateral movement to normal position, after which, when the rod 70 is released and the escapement lever rocks in the opposite direction, the next highest totalizer will be brought under control of the lever 505. Of course, if the totalizer is not located over the actuating racks, the operation of the escapement by pushing in the rod 70, will result in dropping the frame 500 to the second or third position to place the middle or uppermost totalizers under control of the lever 500.

From the above, it will be seen that the totalizers are under control of the paper carriage and also under manual control, the leftward movement of the paper carriage causing the totalizers to successively drop into position, or the successive operation of pushing the rod 70 inwardly producing a like result. Also, that the restoration of the totalizers to normal position, that is, by raising them, is under control of the paper carriage by virtue of the projection 53 and the rod 55 and its connections, or the handle 75 may be operated manually.

The manner of introducing items into the forward totalizers when the same are positioned over the racks, or taking totals therefrom, the construction and operation of the carrying mechanism, multiplying mechanism including the totalizer wheels 268 their associate carrying mechanism, and other parts illustrated in the drawings, are the same as those illustrated and described in the aforesaid patent and application, and therefore I do not deem it necessary to give an extended description of the same here. I will also state that the particular construction herein shown and described for manually operating the escapement mechanism to bring the totalizers successively under control of the lever 505 and for manually restoring the totalizers to their normal or first position, is disclosed in an application filed by Hubert Hopkins May 11, 1908, serially numbered 432,166; and I therefore make no claim to the same in this application.

What I claim is:

1. In a calculating machine, a power shaft, actuating devices, a group of totalizer wheels normally located to one side of said actuating devices, and means operated by the power shaft for moving said totalizer wheels into operative relation to said actuating devices.

2. In a calculating machine, a power shaft, actuating devices, a totalizer normally located to one side of said actuating devices, means operated by the power shaft for moving said totalizer into operative relation to said actuating devices, and means for holding said totalizer in operative relation to said actuating devices whereby items may be successively introduced therein.

3. In a calculating machine, a power shaft, actuating devices, a totalizer normally located to one side of said actuating devices, means operated by the power shaft for moving said totalizer into operative relation to said actuating devices, means for holding said totalizer in operative relation to said actuating devices whereby items may be successively introduced therein, a laterally movable paper carriage, and means operated by said paper carriage for effecting a displacement of said totalizer with respect to said actuating devices.

4. In a calculating machine, a power shaft, actuating devices, a totalizer normally located to one side of said actuating devices, means operated by the power shaft for moving said totalizer into operative relation to said actuating devices, means for holding said totalizer in operative relation to said actuating devices whereby items may be successively introduced therein, and manually operable means for effecting a displacement of said totalizer with respect to said actuating devices.

5. In a calculating machine, actuating devices, a plurality of totalizers located to one side thereof, a power shaft and connections for moving a totalizer into operative relation to said actuating devices, and means for selectively placing a totalizer under the control of said power shaft and its connections.

6. In a calculating machine, the combination of actuating devices, a power shaft and its connections, a plurality of totalizers located to one side of said actuating devices, a laterally movable carriage, and means operated by said carriage for selectively placing a totalizer under control of said power shaft and its connections.

7. In a calculating machine, the combination of actuating devices, a power shaft and its connections, a plurality of totalizers located to one side of said actuating devices, means for selectively placing one of said totalizers into operative relation with said actuating devices, and means for restoring said totalizers to their initial or first position.

8. In a calculating machine, the combination of actuating devices, a power shaft and its connections, a plurality of totalizers located to one side of said actuating devices, means for selectively placing one of said totalizers into operative relation with said actuating devices, and a laterally movable paper carriage for restoring said totalizers to their initial or first position.

9. In a calculating machine, the combination of actuating devices, a power shaft and its connections, a plurality of totalizers located to one side of said actuating devices, means for selectively placing one of said totalizers into operative relation with said actuating devices, and manually operable means for restoring said totalizers to their initial or first position.

10. In a calculating machine, actuating devices, a plurality of totalizers arranged in vertical series, means for laterally moving a selected group of totalizer wheels into operative relation to said actuating devices, a frame on which said groups of totalizer wheels are mounted, and means for vibrating said frame for effecting engagement and disengagement between the selected group of totalizer wheels and said actuating devices.

11. In a calculating machine, the combination of actuating devices, a plurality of totalizers superposed one above the other and located to one side of said actuating devices, means for locking said totalizer wheels against rotation when so located to one side of the actuating devices, and means for releasing a selected group of totalizer wheels, and means for shifting said totalizer wheels laterally and placing them under or in control of said actuating devices.

12. In a calculating machine, the combination of actuating devices, a vibrating frame, a second frame carried by said vibrating frame and partaking of the movement thereof, said second frame having also a movement independently of said vibrating frame, a plurality of totalizers carried by said second frame, and means for moving a selected group of totalizer wheels into a position to be under or in control of the actuating devices.

13. In a calculating machine, the combination of a vertically movable frame carrying a plurality of independently laterally movable sets of totalizer wheels, and a plurality of locking bars on said frame one for each of said sets of totalizers for preventing rotation of said totalizer wheels.

14. In a calculating machine, the combination of actuating devices, a vertically movable frame carrying groups of independently laterally movable sets of totalizer wheels, a locking bar for each group of totalizer wheels, and means for moving said wheels beyond the control of said locking bars and into operative relation to said actuating devices.

15. In a calculating machine, the combination of actuating devices, a vertically movable frame, a plurality of superposed groups of totalizer wheels, a locking bar for each group of wheels, and means for moving a selected group of wheels beyond the control of said locking bar and into operative relation to said actuating devices.

16. In a calculating machine, the combination of a vibrating frame, a second frame partaking of the movement of said vibrating frame and having a movement independently of said vibrating frame, groups of totalizer wheels carried by said second frame, actuating devices therefor, a power shaft and its connections, means for placing a selected group of totalizer wheels under control of said power shaft and its connections whereby said group of totalizer wheels is moved into operative relation to said actuating devices, and means at each end of the group of totalizer wheels for supporting the same in position upon said vibrating frame when in operative relation to the actuating devices.

17. In a calculating machine, the combination of a vertically movable frame, superposed groups of totalizer wheels carried thereby, actuating devices therefor, and an escapement mechanism coöperating with said frame for controlling the position of said groups of totalizer wheels relative to said actuating devices.

18. In a calculating machine, the combination of a vibrating frame, a second vertically movable frame, an escapement mechanism carried by said vibrating frame and controlling the position of the vertically movable frame, and groups of totalizer wheels carried by said vertically movable frame.

19. In a calculating machine, the combination of carrying mechanism, actuating racks, a vibrating frame, a vertically movable frame, an escapement mechanism mounted on the vibrating frame and controlling the position of the vertically movable frame, groups of totalizer wheels carried by the vertically movable frame, and means whereby a group of totalizer wheels in operative relation to the actuating racks may be displaced laterally with respect thereto, the aforesaid escapement mechanism effecting a movement of the vertically movable frame, carrying mechanism, and actuating racks.

20. In a calculating machine, the combination of actuating devices, a group of totalizer wheels, a spring for moving said totalizer wheels laterally out of operative relation to said actuating devices, means for holding said totalizer wheels in operative relation to said actuating devices, said means, when operated to release said totalizer wheels to effect such lateral displacement, also effecting a vertical displacement of said group of totalizer wheels.

21. In a calculating machine, the combination of actuating devices, a vertically movable frame, a plurality of groups of totalizer wheels carried thereby, means for moving a selected group of totalizer wheels into operative relation to said actuating devices, means for holding said selected group in such position, and devices for actuating said holding means to release said group of totalizer wheels to permit lateral displacement thereof with respect to said actuating devices, and, coincidentally, the vertical displacement of said group of totalizer wheels.

22. In a calculating machine, the combination of actuating devices, a power shaft and its connections, which connections include a block, a plurality of totalizers, a movable frame in which the shafts of said totalizers are slidably mounted, and collars on said shafts for coöperating with said grooved block.

23. In a calculating machine, the combination of actuating devices, printing type controlled thereby, a totalizer to one side of, and normally out of operative relation to, said actuating devices, and means for laterally moving said totalizer in operative relation to said actuating devices for controlling the movement of said actuating devices in the printing of a total contained in said totalizer.

24. In a calculating machine, the combination of actuating devices, printing mechanism for listing items and printing the total thereof, the type in said printing mechanism being controlled by said actuating devices, a plurality of totalizers normally to one side of, and out of operative relation to, said actuating devices, means for positioning stops to control the movement of said actuating devices, means for positioning a selected totalizer in operative relation to said actuating devices whereby an item may be introduced therein, and means whereby any one of said totalizers may be moved laterally and placed in control of said actuating devices for the printing of totals therefrom.

25. In a calculating machine, the combination of actuating devices, printing type positioned thereby, a plurality of totalizers, and means for laterally positioning a selected totalizer in operative control of said actuating devices for the purpose of printing a total therefrom.

26. In a calculating machine, a power shaft, actuating devices, printing type controlled thereby, a plurality of totalizers located normally to one side of the actuating devices, and means for moving said totalizers laterally into operative relation to the actuating devices which means is operated by the power shaft.

27. In a calculating machine, the combination of a power shaft, actuating devices, one or more groups of totalizer wheels located normally to one side thereof, means for moving a selected group of totalizer wheels into operative relation with said actuating devices, said means being operated by the power shaft, another group of totalizer wheels normally in position with respect to said actuating devices, and means whereby a number registered in said last mentioned group may be transferred to any selected group of totalizer wheels first mentioned.

In testimony whereof I hereunto affix my signature in the presence of two witnesses, this 5th day of December, 1910.

WILLIAM W. HOPKINS.

Witnesses:
M. P. SMITH,
BLANCHE L. CROWLEY.

Copies of this patent may be obtained for five cents each, by addressing the "Commissioner of Patents, Washington, D. C."